(12) United States Patent
Duran

(10) Patent No.: US 8,630,922 B2
(45) Date of Patent: Jan. 14, 2014

(54) ESCROW ACCOMMODATION SYSTEM

(76) Inventor: Ruben G. Duran, Los Angeles, CA (US)

(*) Notice: Subject to any disclaimer, the term of this patent is extended or adjusted under 35 U.S.C. 154(b) by 0 days.

(21) Appl. No.: 13/424,231

(22) Filed: Mar. 19, 2012

(65) Prior Publication Data
US 2012/0173389 A1     Jul. 5, 2012

Related U.S. Application Data

(63) Continuation of application No. 09/916,927, filed on Jul. 27, 2001, now Pat. No. 8,140,430.

(51) Int. Cl.
*G06Q 40/00*     (2012.01)

(52) U.S. Cl.
USPC ........... 705/27.1; 705/1; 705/5; 705/14.34; 705/35; 705/36 R; 705/37; 705/38; 705/39; 348/14.08; 713/200

(58) Field of Classification Search
USPC .................. 705/1, 14.34, 35–39, 5, 27.1; 348/14.08; 713/200
See application file for complete search history.

(56) References Cited

U.S. PATENT DOCUMENTS

| | | | |
|---|---|---|---|
| 6,684,196 B1* | 1/2004 | Mini et al. | 705/14.34 |
| 2001/0047328 A1* | 11/2001 | Triola | 705/39 |
| 2002/0029350 A1* | 3/2002 | Cooper et al. | 713/200 |
| 2002/0128852 A1* | 9/2002 | Draughon | 705/1 |
| 2002/0143569 A1* | 10/2002 | Draughon | 705/1 |
| 2002/0154210 A1* | 10/2002 | Ludwig et al. | 348/14.08 |
| 2010/0114743 A1* | 5/2010 | Misraje et al. | 705/35 |

* cited by examiner

*Primary Examiner* — Harish T Dass
(74) *Attorney, Agent, or Firm* — Smyrski Law Group, A P.C.

(57) ABSTRACT

An escrow accommodation system is provided, including a first escrow client subsystem disposed in a first location, said first escrow client subsystem including first software and a first communication device comprising a first camera configured to be operated with the first software to facilitate an online videoconference meeting regarding an escrow, and a second escrow client subsystem disposed in a second location, said second escrow client subsystem including second software and a second communication device comprising a second camera configured to facilitate the online videoconference meeting regarding the escrow. The first escrow client subsystem is configured to display a list of available escrow companies for performing escrow services and fees associated with available escrow companies, and the first escrow client subsystem is configured to facilitate an escrow opening meeting online between a customer and an escrow company selected from the list.

14 Claims, 4 Drawing Sheets

ESCROW ACCOMMODATION SYSTEM

The present application is a continuation of co-pending U.S. patent application Ser. No. 09/916,927, entitled "Escrow Accommodation System," inventor Ruben Duran, filed Jul. 27, 2001, the entirety of which is incorporated herein by reference.

BACKGROUND OF THE INVENTION

1. Field of the Invention

The present invention relates to communications systems. More specifically, the present invention relates to video-conferencing systems.

2. Description of the Related Art

As described in "Escrow", Microsoft® Encarta® Encyclopedia 2000, an escrow, in law, is a conditional delivery of money, property or documents evidencing or transferring rights therein, to a third party to be kept by that party until certain conditions are satisfied and then to be delivered over to an obligee or grantee. The property or documents thus conditionally held are also called the escrow and the contract defining the conditions of the second delivery is called the 'escrow agreement or escrow instructions'. An escrow is a device most frequently utilized in real-estate transactions. A deed, for example, delivered in escrow does not operate as an obligation or conveyance so long as it remains in the hands of the third person. When the prescribed conditions are fulfilled, the deed generally takes effect from the second delivery.

Conventionally, escrow services were provided by independent escrow companies. However, more recently, real estate brokers, title insurance companies, and others have begun to offer escrow services for the convenience of their customers and to generate supplemental income. Unfortunately, these 'secondary' escrow service providers must bear significant costs associated with the provision of escrow services. Those who have purchased or refinanced a home recently can appreciate the amount of labor involved in the escrow process. Thus, the provision of onsite escrow services by a secondary escrow company typically involves a salary with benefits for the escrow officer, an office, phone and fax services, advertising expenses, etc. Consequently, the supplemental income due to the provision of onsite escrow services is currently often marginal.

In addition, prospective buyers and sellers do not currently have an opportunity to shop for an optimal escrow company. Instead, an escrow agent is typically recommended by a broker and accepted the parties without further consideration. Consequently, the costs and the quality of the escrow services provided to the would-be buyers and sellers may be less than optimal.

For these and other reasons, a need exists in the art for a system or method for improving the availability and accessibility of independent escrow services. More specifically, a need exists in the art for a system or method for reducing the costs associated with onsite escrow services borne by secondary escrow service providers while increasing the options of buyers and sellers with respect to providers of escrow services.

SUMMARY OF THE INVENTION

The need the art is addressed by the escrow accommodation system (EAS) of the present invention. The inventive system includes a first client subsystem disposed in a first office. The first client subsystem includes a microprocessor, software running on the microprocessor for facilitating an escrow arrangement, a camera coupled to the microprocessor, and a display coupled to the computer. A second client subsystem is provided in a second office. The second client subsystem includes a microprocessor, software running on the microprocessor for facilitating an escrow arrangement, a camera coupled to the microprocessor, and a display coupled to the microprocessor. The first and second client subsystems are connected via a network.

In an illustrative application, the system is adapted for deployment in the offices of brokers, mortgage companies, lending institutions and title insurers to facilitate remote video-conferencing of potential buyers and sellers with independent escrow agents. In the illustrative embodiment, the software includes code for receiving customer escrow data and displaying a list of escrow companies. In various alternative embodiments, the list is customized based on user data and/or broker data. As taught herein, the software includes code for establishing a video-conference between the first client and the second client via the network. The network may be either a public network such as the Internet or a private or virtually private network. The software further includes code for facilitating an escrow opening meeting online. Code is also included for running customized applications based on input from an escrow agent, a customer, a broker or other third party.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
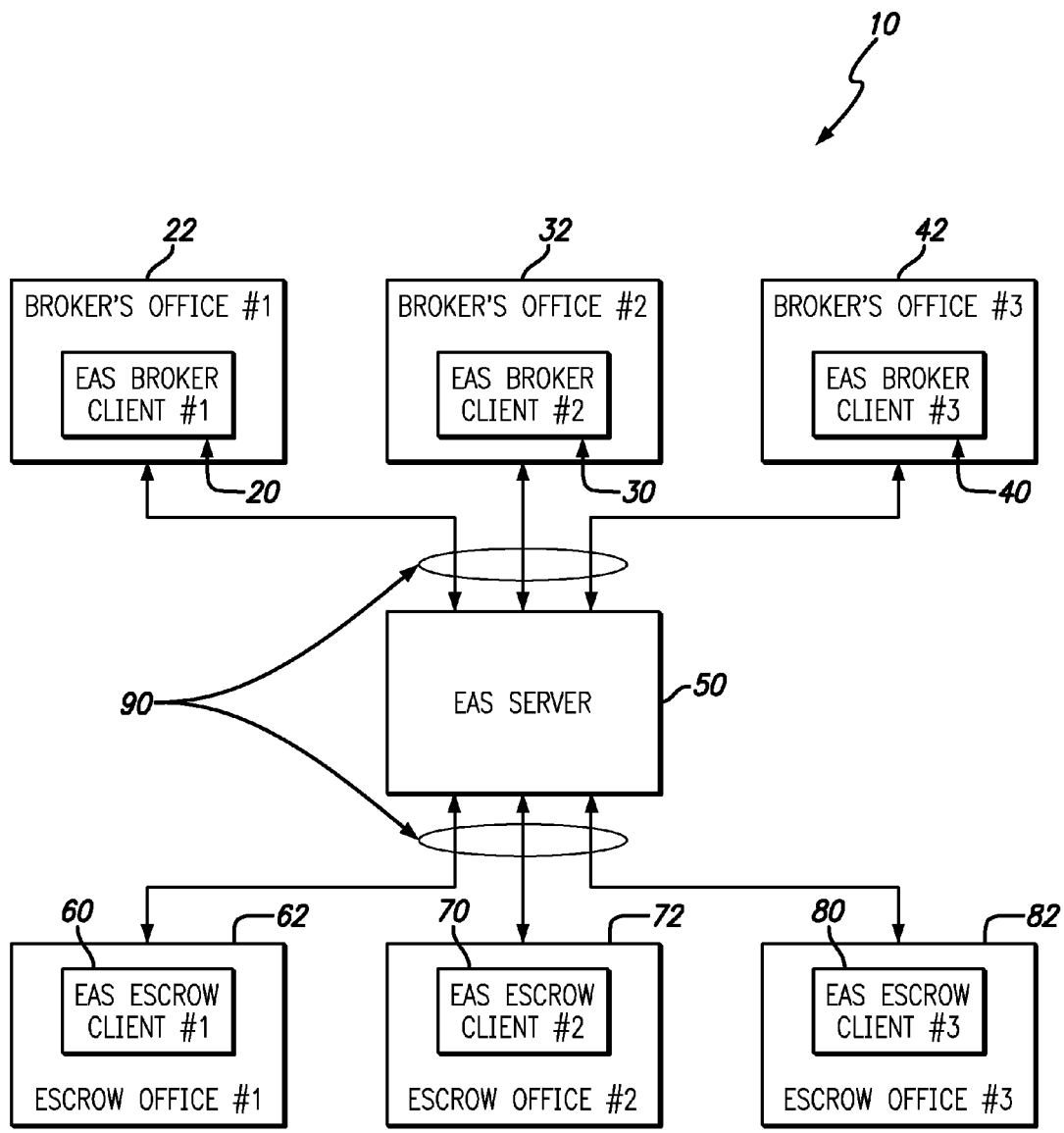
FIG. 1 is a block diagram of an illustrative embodiment of an escrow accommodation system implemented in accordance with the teachings of the present invention.

FIG. 1 is a block diagram of an illustrative embodiment of an escrow accommodation system implemented in accordance with the teachings of the present invention. The system 10 is shown with first, second and third broker clients 20, 30, and 40, respectively, provided in first second and third broker's offices 22, 32, and 42, respectively. Each broker client is connected to each of several escrow clients of which three are shown in FIG. 1: 60, 70, and 80. The first escrow client 60 is provided in the first escrow office 62, the second escrow client 70 is provided in the second escrow office 72 and the third escrow client 80 is provided in the third escrow office 82.

Those skilled in the art will appreciate that although three broker clients and three escrow clients are shown in FIG. 1, the invention is not limited thereto. That is, the teachings of the present invention may be implemented with any number of broker clients and escrow clients without departing from the scope of the present teachings.

In accordance with the present teachings, the broker clients are connected to the escrow clients via a server 50 and a network 90.

Figure 2:
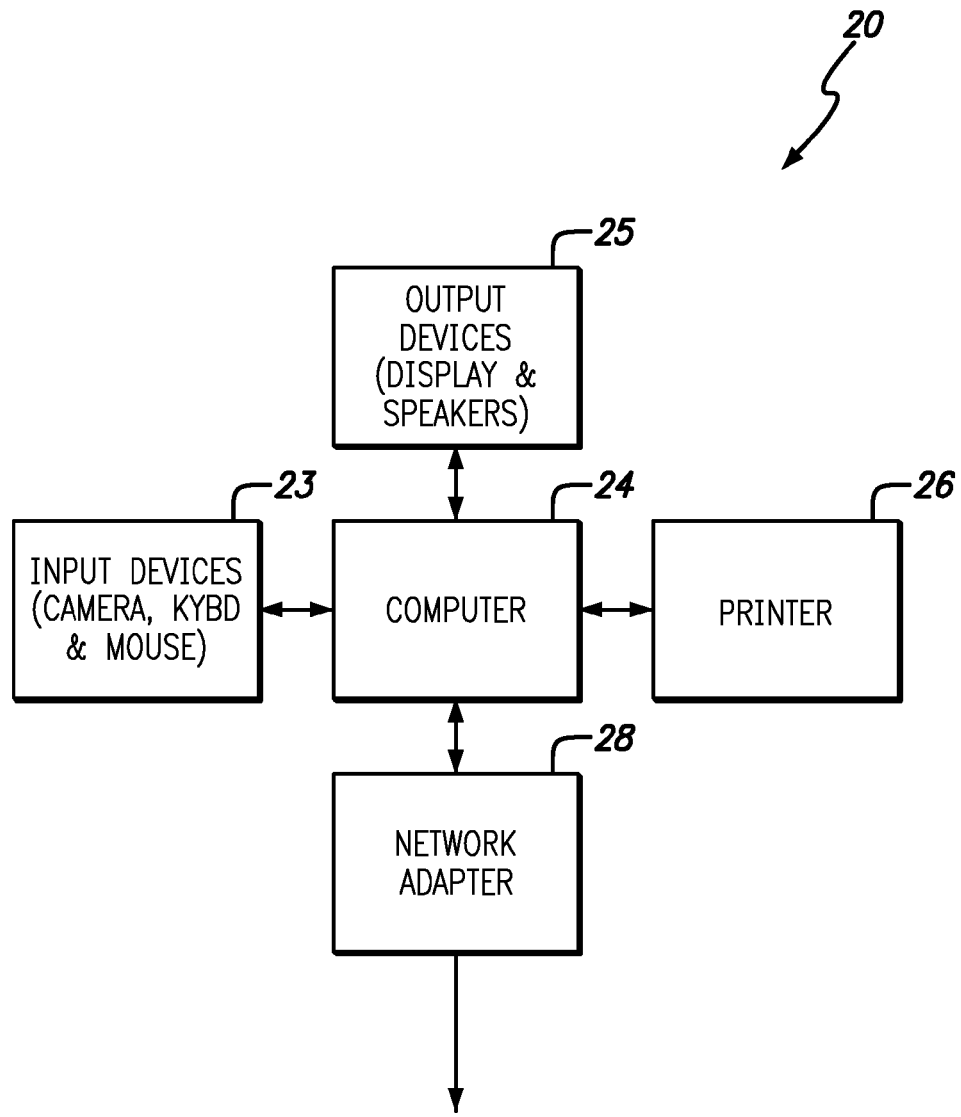
FIG. 2 is a simplified block diagram of an illustrative implementation of a client subsystem in accordance with the teachings of the present invention.

FIG. 2 is a simplified block diagram of an illustrative implementation of a client subsystem in accordance with the teachings of the present invention. As each of the clients may be implemented in substantially the same manner, only the first broker client 20 is illustrated in FIG. 2. In accordance with the present teachings, each client is equipped with a computer 24 within which a general-purpose microprocessor (not shown) is disposed. The computer 24 receives input from a plurality of input devices 23 including, in accordance with the present teachings, a camera, keyboard and mouse. The camera 23 provides an image of the user to a receiving client (escrow officer) via the computer 24, a network adapter 28, the server 50, and the network 90 (see FIG. 1). In accordance with the present teachings, an image or voice of an independent escrow agent is received by the client 20 via the network 90, network adapter 28, and the computer 24 and displayed on a multimedia screen 25. In the best mode, the screen 25 is a large flat-panel display. The EAS system 10 is controlled by software running on the computer 24.

Figure 3A:
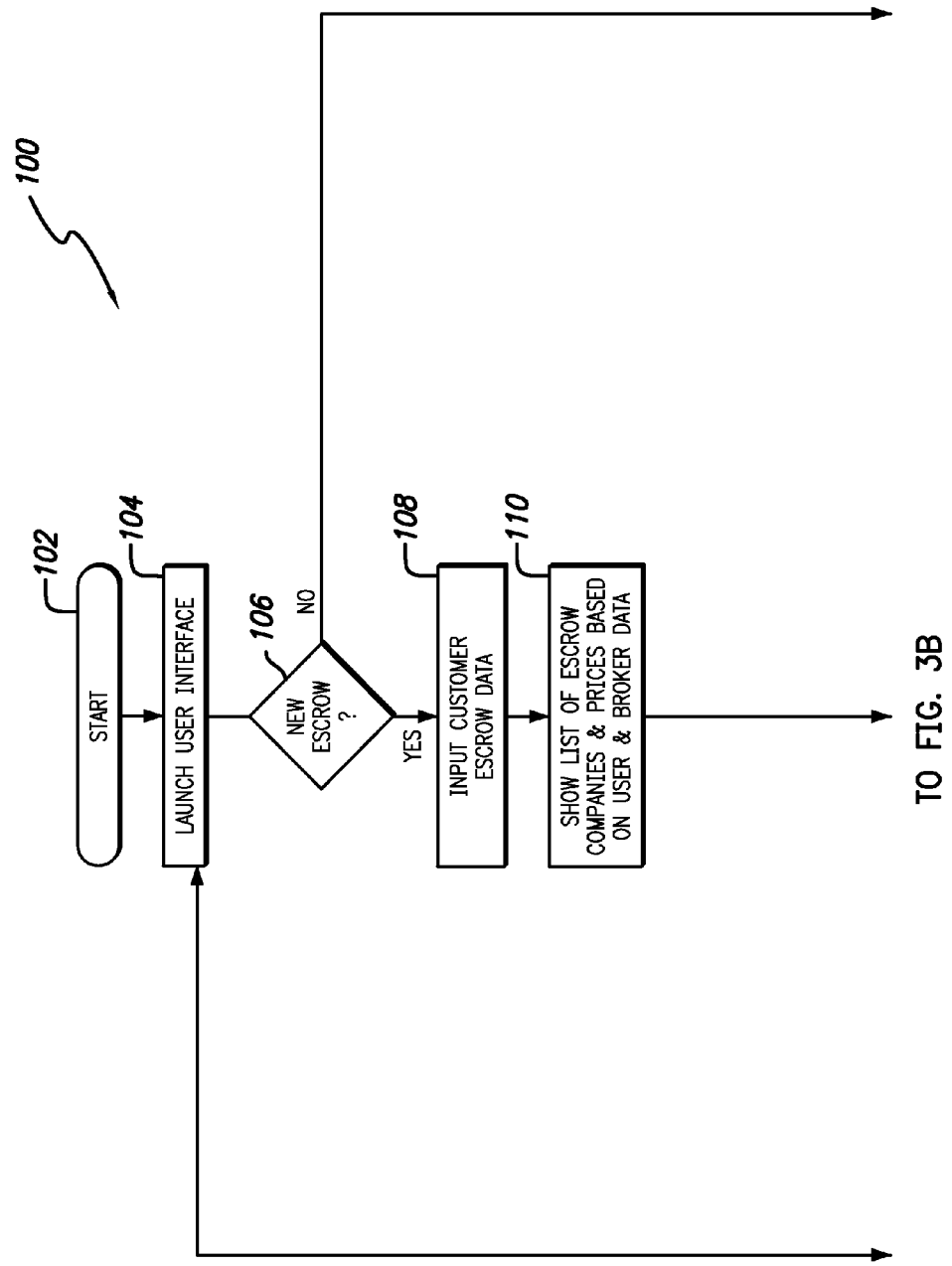
FIG. 3 is a flow diagram showing an illustrative embodiment of software running on the client computers and adapted to implement the EAS system of the present invention.
Figure 3B:
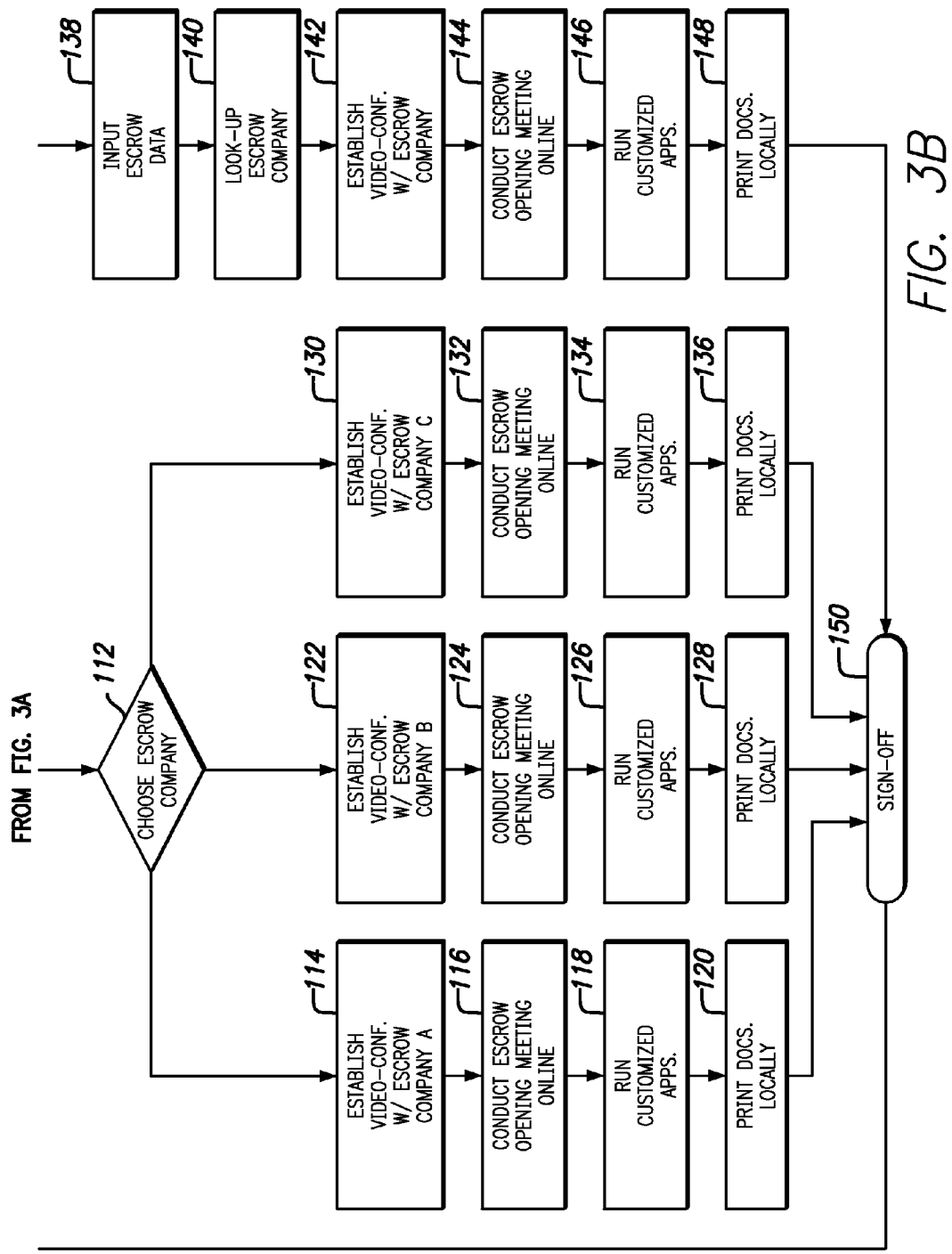

FIG. 3 is a flow diagram showing an illustrative embodiment of software running on the client computers and adapted to implement the EAS system of the present invention. The software 100 is adapted to maintain a standby state at step 102 until initiated by user via a keystroke or movement of a mouse. At step 104, the software launches a user interface which, at step 106, prompts the user to indicate whether the user is seeking to implement or change an existing escrow or establish a new escrow arrangement. If the user seeks to establish a new escrow arrangement, then at step 108 the user inputs customer escrow data using one of a number of commercially available escrow software packages such as Simon and Escrowlink.

The software 100 responds by displaying a list of escrow companies along with price, address, phone number and other relevant information at step 110. In accordance with the present teachings, this list is customized based on the relationships between the brokers and the escrow agents, user data, broker data and any other relevant considerations.

At step 112, the user selects an escrow company and at step 114, 122, or 130, the system establishes a video-conference with the selected escrow company. Assuming Company A is selected, then at step 116, an escrow opening meeting is conducted online in video-conferencing mode. At this point, the escrow officer asks the prospective buyer or seller a variety of questions relating to the escrow arrangement. During this process, one or more software applications, customized for the escrow company, may be run. The application processes data input from the prospective buyer or seller at step 108 and provides documents to the buyer or seller locally via a printer 26.

Note that steps 122 through 128 and steps 130 through 136 are shown as being substantially identical to steps 114 through 120. Nonetheless, in practice, the steps may be customized for the requirements and preferences of the escrow company, the broker, and or the user without departing from the scope of the present teachings.

If at step 106, the user, i.e., the prospective buyer or seller, indicates a willingness to work on an existing escrow, then at step 138 escrow data is input such as an escrow number and the system 100 looks up the escrow agreement and the appropriate escrow company at step 140. The system in executes steps 142 through 148 as per steps 114 through 120.

At step 150 the user signs off and the system returns to standby mode that step 104. The software 100 may be easily implemented in C, C++, JAVA, Visual Basic or any other suitable conventional programming language by one of ordinary skill in the art without undue experimentation.

Further, those skilled in the art will appreciate that conventional software may be implemented on the server 50 to facilitate the routing of video-conferencing calls in accordance with HTTP, FTP TCP/IP, NETBUI, IPX SPX, or other suitable protocols.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. An escrow accommodation system comprising:
a device configured to facilitate an escrow transaction between:
a first escrow client subsystem disposed in a first location, said first escrow client subsystem including first software and a first communication device operable to communicate escrow information, said first communication device configured to be operated with the first software to facilitate an online meeting regarding an escrow, wherein the first client subsystem comprises code for running customized escrow applications based on input received from at least one of an escrow agent, a customer, a broker, and another third party; and
a second escrow client subsystem disposed in a second location, said second escrow client subsystem including second software and a second communication device operable to communicate escrow information based on instructions from said second software, said second communication device configured to be operated with the second software to facilitate the online meeting regarding the escrow;
wherein the device interfaces with a network thereby connecting said first and second escrow client subsystems;
and further wherein the first escrow client subsystem is configured to display a list of available escrow companies for performing escrow services and fees associated with available escrow companies, the list of available escrow companies customizable based on a relationship between each available escrow company and at least one broker, and the first escrow client subsystem is further configured to facilitate an escrow opening meeting online between a customer and an escrow company selected from the list of available escrow companies.

2. The escrow accommodation system of claim 1 wherein said first software includes code for receiving customer escrow data.

3. The escrow accommodation system of claim 1 wherein said first software includes code for displaying a list of escrow companies.

4. The escrow accommodation system of claim 1 wherein said first software and said second software includes code for establishing a video-conference between said first client and said second client via said network.

5. The escrow accommodation system of claim 1 wherein said third party is a real estate broker.

6. The escrow accommodation system of claim 1 wherein said first software includes code for retrieving an existing escrow account.

7. The escrow accommodation system of claim 1 wherein said first office is an escrow office.

8. The escrow accommodation system of claim 7, wherein the escrow office is an independent escrow office.

9. The escrow accommodation system of claim 1 including further first client subsystems disposed in respective independent escrow offices.

10. The escrow accommodation system of claim 1 wherein said second location is a broker's office.

11. The escrow accommodation system of claim 10 including further second client subsystems disposed in respective brokers offices.

12. The escrow accommodation system of claim 8 wherein said second location is a title insurance office.

13. An escrow accommodation system comprising:
a first escrow client subsystem disposed in a first location, said first escrow client subsystem including:
first software configured to facilitate an escrow arrangement, said first software comprising code for running customized escrow applications based on input received from at least one of an escrow agent, a customer, a broker, and another third party;
a first device operable to receive and communicate first escrow information based on instructions from said first software, said first device configured to be operated with the first software to facilitate an online meeting regarding an existing escrow, and
a second escrow client subsystem disposed in a second location, said second escrow client subsystem including:
second software configured to facilitate the escrow arrangement,
a second device operable to receive and communicate second escrow information based on instructions from said second software, said second device configured to be operated with the second software to facilitate the online meeting regarding the existing escrow,
wherein a device interfaces with a network thereby connecting said first and second escrow client subsystems;
and further wherein the first escrow client subsystem is configured to display a list of available escrow companies for performing escrow services and fees associated with available escrow companies, the list of available escrow companies customizable based on a relationship between each available escrow company and at least one broker, and the first escrow client subsystem is further configured to facilitate an escrow opening meeting online between a customer and an escrow company selected from the list of available escrow companies.

14. An escrow accommodation system comprising:
a first escrow client subsystem disposed in a first location, said first escrow client subsystem including first software and a first communication device operable to communicate escrow information based on instructions from said first software, said first communication device comprising a first recording device configured to be operated with the first software to facilitate an online meeting regarding an escrow, said first software comprising code for running customized escrow applications based on input received from at least one of an escrow agent, a customer, a broker, and another third party; and
a second escrow client subsystem disposed in a second location, said second escrow client subsystem including second software and a second communication device comprising a second recording device configured to be operated with the second software to facilitate the online meeting regarding the escrow;
wherein the first escrow client subsystem is configured to display a list of available escrow companies for performing escrow services and fees associated with available escrow companies, the list of available escrow companies customizable based on a relationship between each available escrow company and at least one broker, and the first escrow client subsystem is further configured to facilitate an escrow opening meeting online between a customer and an escrow company selected from the list of available escrow companies.

* * * * *